(12) United States Patent
Liao et al.

(10) Patent No.: US 7,111,308 B2
(45) Date of Patent: Sep. 19, 2006

(54) PROTECTION METHOD FOR MANUAL EJECTION OPERATION OF OPTICAL DISK DRIVE

(75) Inventors: Cheng-Yao Liao, Taipei (TW); Ching Ho Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 398 days.

(21) Appl. No.: 10/734,271

(22) Filed: Dec. 15, 2003

(65) Prior Publication Data

US 2004/0165487 A1    Aug. 26, 2004

Related U.S. Application Data

(63) Continuation-in-part of application No. 09/858,605, filed on May 17, 2001, now abandoned.

(51) Int. Cl.
*G11B 17/04* (2006.01)
(52) U.S. Cl. .................... 720/609; 369/30.36
(58) Field of Classification Search ............. 720/609, 720/661; 369/75.21, 77.11, 77.21, 215.1, 369/219.1, 223; 360/99.02, 99.03, 99.06, 360/99.07, 267.3, 267.4
See application file for complete search history.

(56) References Cited

U.S. PATENT DOCUMENTS

| | | | | |
|---|---|---|---|---|
| 5,126,899 A * | 6/1992 | Kanazawa | ............... | 360/99.07 |
| 5,297,117 A * | 3/1994 | Uzuki et al. | ................ | 720/634 |
| 5,386,407 A * | 1/1995 | Park | .......................... | 720/638 |
| 5,757,583 A * | 5/1998 | Ogawa et al. | ........... | 360/99.07 |
| 6,266,311 B1 * | 7/2001 | Song et al. | ................. | 720/609 |
| 6,456,457 B1 * | 9/2002 | Aibara et al. | ............ | 360/99.06 |
| 6,496,463 B1 * | 12/2002 | Ogawa et al. | ............. | 720/606 |
| 6,603,723 B1 * | 8/2003 | Minase | ....................... | 720/673 |

* cited by examiner

Primary Examiner—Angel Castro
(74) Attorney, Agent, or Firm—Rosenberg, Klein & Lee

(57) ABSTRACT

A protection method for manual ejection operation of optical disk drive is proposed. In the present method, a locked state is set when the optical disk drive is in normal rotation. The load-sensing switch would turn to the on position (stage) when the optical disk is loaded in the tray and in the rotating state. When a manual ejection operation with manual ejection function is activated, the load sensing switch would turn to the off position (stage). A controller senses the stage change from on position to off position. Then, the controller applies a voltage to the tray motor and the position of the load-sensing switch is returned to the on position. Therefore, a locked state is maintained.

8 Claims, 4 Drawing Sheets

PROTECTION METHOD FOR MANUAL EJECTION OPERATION OF OPTICAL DISK DRIVE

CROSS REFERENCE TO RELATED APPLICATION

This application is a continuation-in-part of U.S. application Ser. No. 09/858,605, filed on 17 May 2001, now abandoned, and entitled "protection method for manual ejection operation of optical disk drive".

FIELD OF THE INVENTION

The present invention relates to a protection method for manual ejection operation of optical disk drive, especially to a protection method for optical disk drive to prevent the careless manual ejection operation when the optical disk drive is in normal rotation.

DESCRIPTION OF THE RELATED ART

The optical disk drive generally has a transmission system to load and eject the optical disk. Moreover, an ejection button mounted on a front end of the optical disk drive is designed for activating the loading and ejecting mechanism to move the tray. As a matter of course, the optical disk is ejected by pressing the ejection button when the user completes the access of the optical disk. For the case of pressing the ejection button in the rotating state of the optical disk, the optical disk would turn to the static state to be ejected. Herein, the rotating state means that the optical disk is rotating and the user information is accessed by the optical disk drive. The static state means that the optical disk stops rotating.

On the other hand, a manual ejection operation with an emergency ejection function is designed to eject an optical disk from the optical disk drive when the optical disk drive is malfunctioned or not powered. An example of the manual ejection operation for emergency is to insert a slim bar into a round opening on a panel of the optical disk drive. As shown in FIGS. 1A and 1B, the panel 4a of the optical disk driver 1a has a round opening 5a thereon. The user could activate a manual ejection operation by inserting a slim bar 3a into the round opening 5a such that the tray 6a could be forced to be ejected from the optical disk drive 1a and the optical disk 2a could be removed.

However, in the above-mentioned optical disk drive 1a, the manual ejection operation could be activated at any time even the optical disk 2a is in the rotating state. If the optical disk 2a is in the rotating state, especially in the high speed rotation, and the manual ejection operation is carelessly or curiously activated by inserting a slim bar 3a into the round opening 5a, the tray 6a would be forced to eject from the optical disk drive 1a.

Therefore, the user information could not be read out because the optical disk 2a itself is destroyed for its exhausted rotating outside the optical disk drive 1a. Also, the user information that attempts to be recorded/reproducing in the optical disk 2a could fail to recorded/reproducing.

Moreover, the optical disk drive 1a and the optical disk 2a run the risk of being damaged due to carelessly activating the manual ejection operation when the optical disk 2a is in the rotating state, especially with high rotation speed.

SUMMARY OF THE INVENTION

An object of the present invention is to provide a protection method for optical disk drive to prevent the careless manual ejection operation when the optical disk drive is in normal rotation.

To achieve the object above, the present invention provides a protection method for manual ejection operation of optical disk drive. In the present method, a locked state is set when the optical disk drive is in normal rotation. The load-sensing switch would turn to the on position (stage) when the optical disk is loaded in the tray and in the rotating state. When a manual ejection operation with manual ejection function is activated, the load-sensing switch would turn to the off position (stage). A controller senses the stage change from on position to off position. Then, the controller applies a voltage to the tray motor and the position of the load-sensing switch is returned to the on position. Therefore, a locked state is maintained.

The various objects and advantages of the present invention will be more readily understood from the following detailed description when read in conjunction with the appended drawing, in which:

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
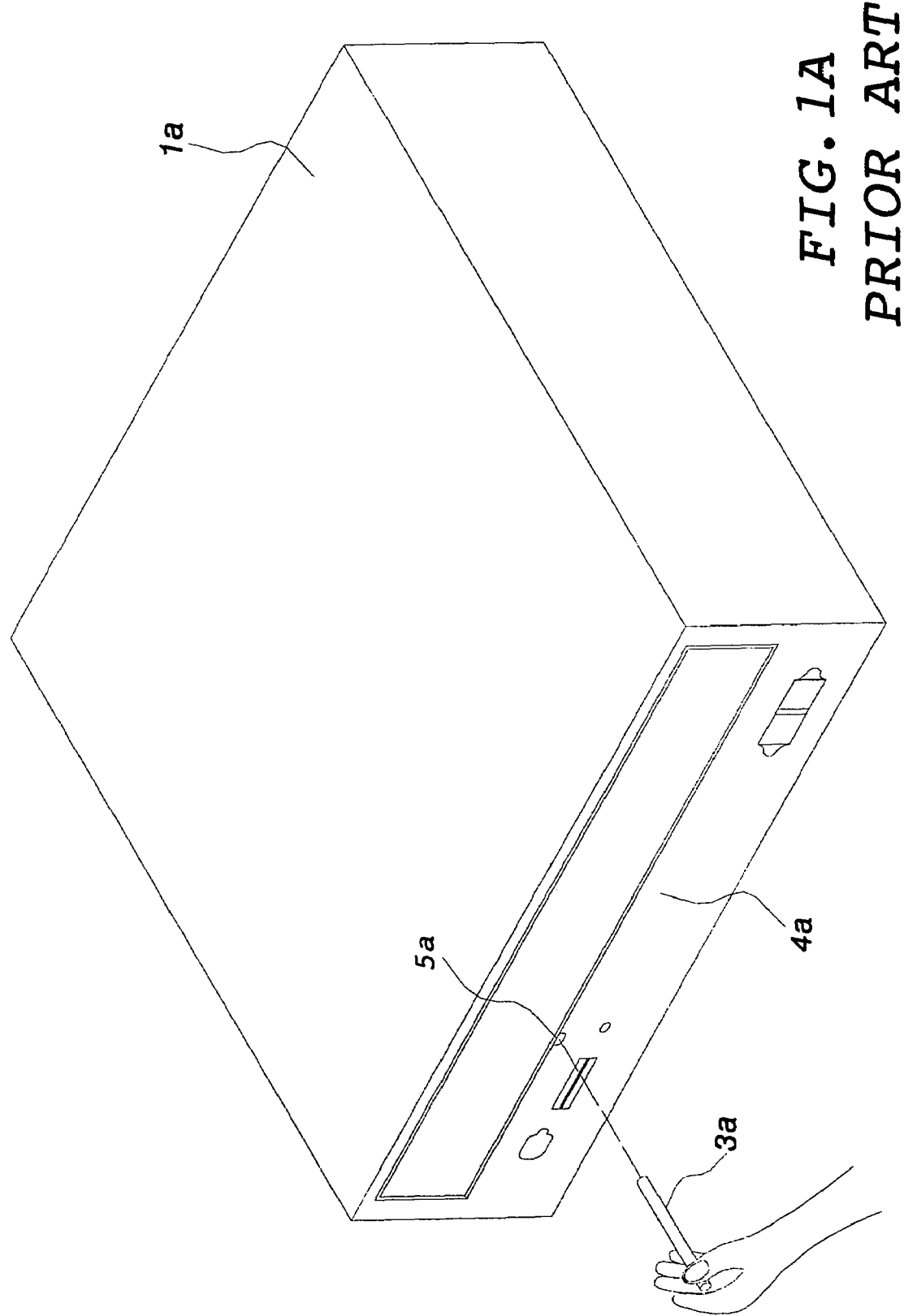
FIG. 1A shows the perspective view of prior art optical disk drive before the manual ejection operation.
Figure 1B:
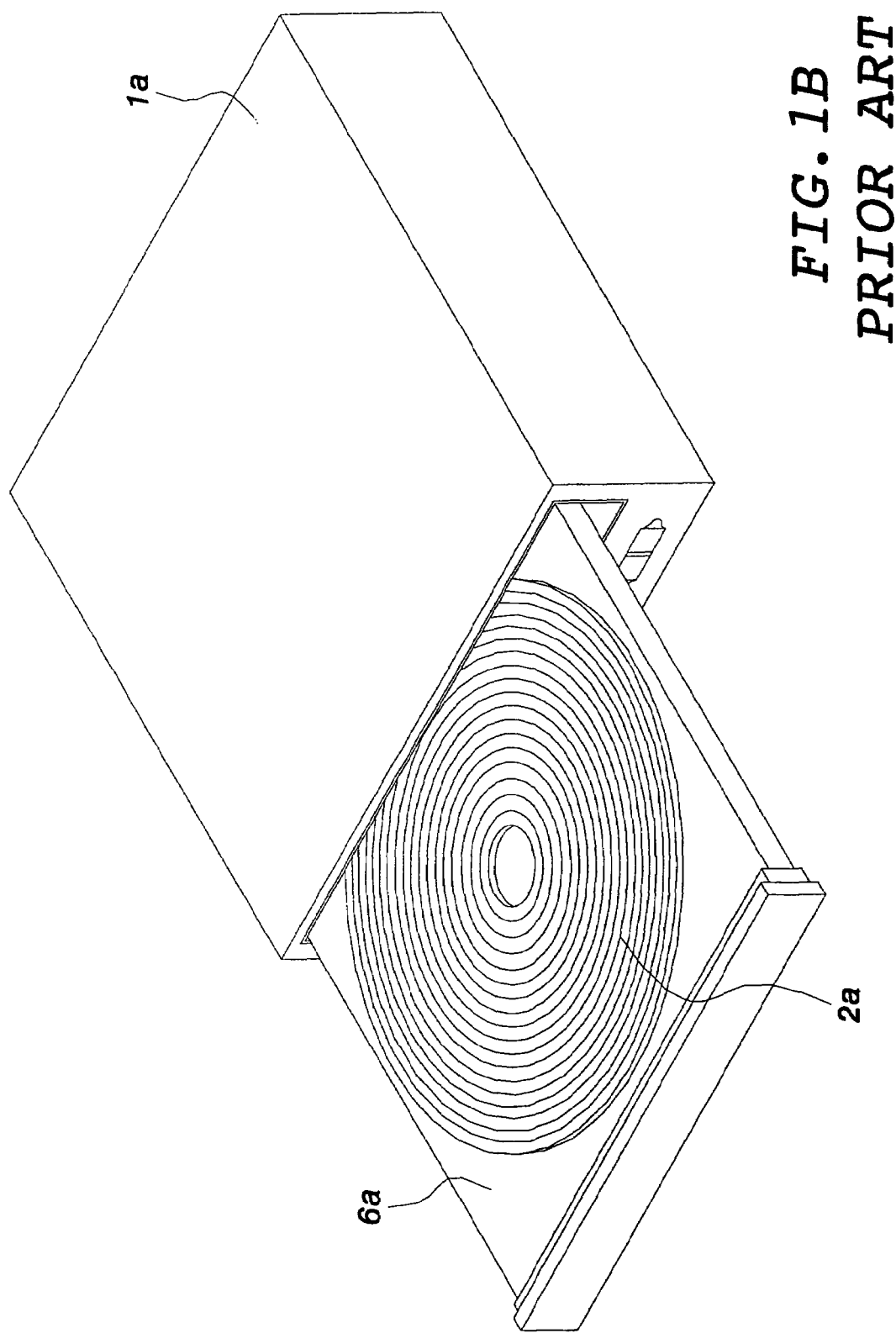
FIG. 1B shows the perspective view of prior art optical disk drive after the manual ejection operation.
Figure 2:
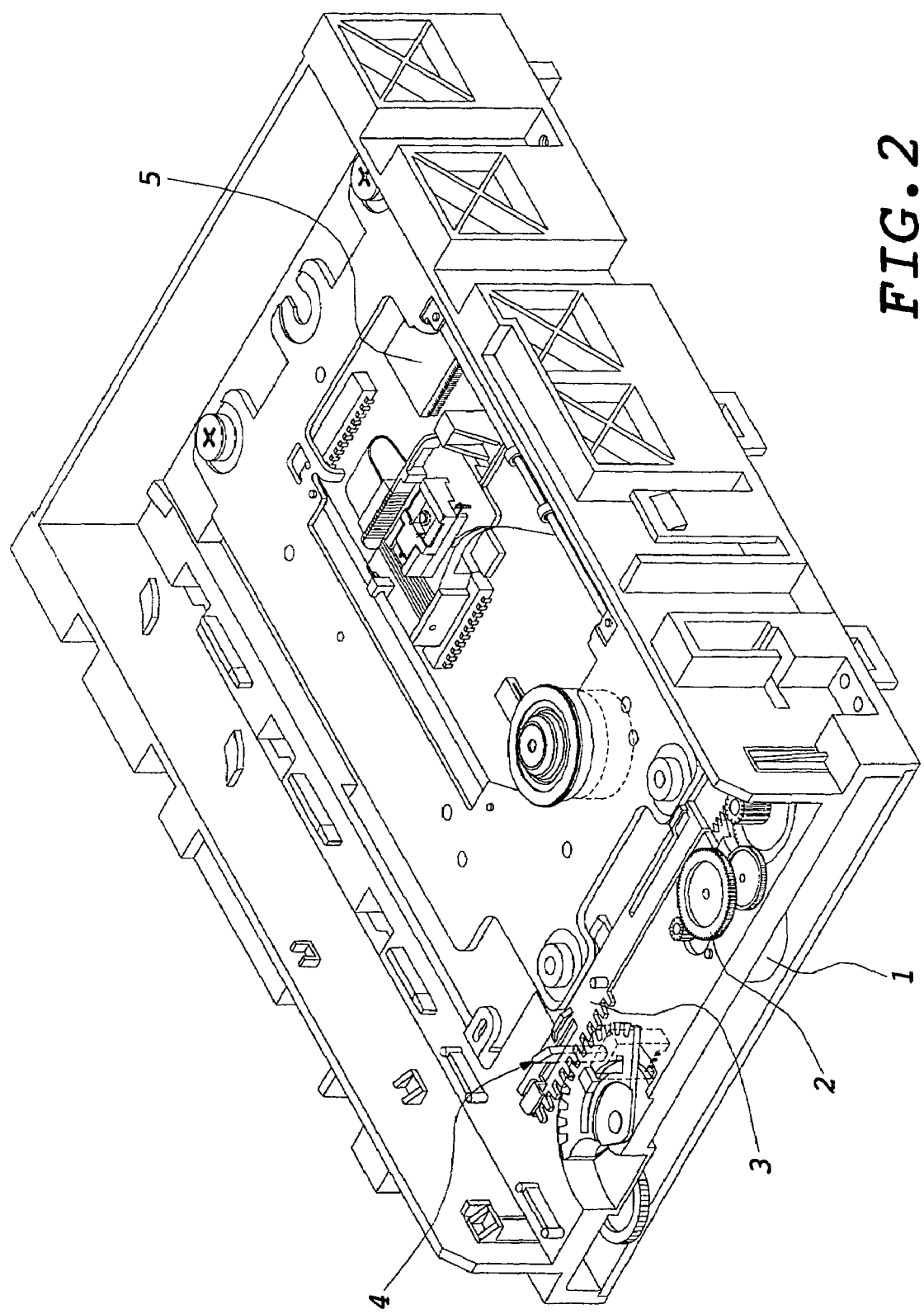
FIG. 2 shows a perspective view of an optical disk drive for demonstrating the protection method.

FIG. 2 shows a perspective view of an optical disk drive for demonstrating the protection method for manual ejection operation of optical disk drive according to the present invention. The tray of the optical disk driver is driven by a tray motor 1 through a transmission mechanism composed of a gear 2 and rack 3.

Moreover, the rotating state is detected by a load-sensing switch 4. The load-sensing switch 4 would turn to the on position (stage) when the optical disk is loading in the tray and in the rotating state. Furthermore, the load-sensing switch 4 would turn to the off position (stage) when the manual ejection operation is activated (triggered). Accordingly, a locked state is set when the optical disk is loaded and in the rotating state.

Furthermore, the present invention provides a controller 5 to sense the on/off position of the load-sensing switch 4 and provides a voltage of a predetermined level to the tray motor 1.

Figure 3:
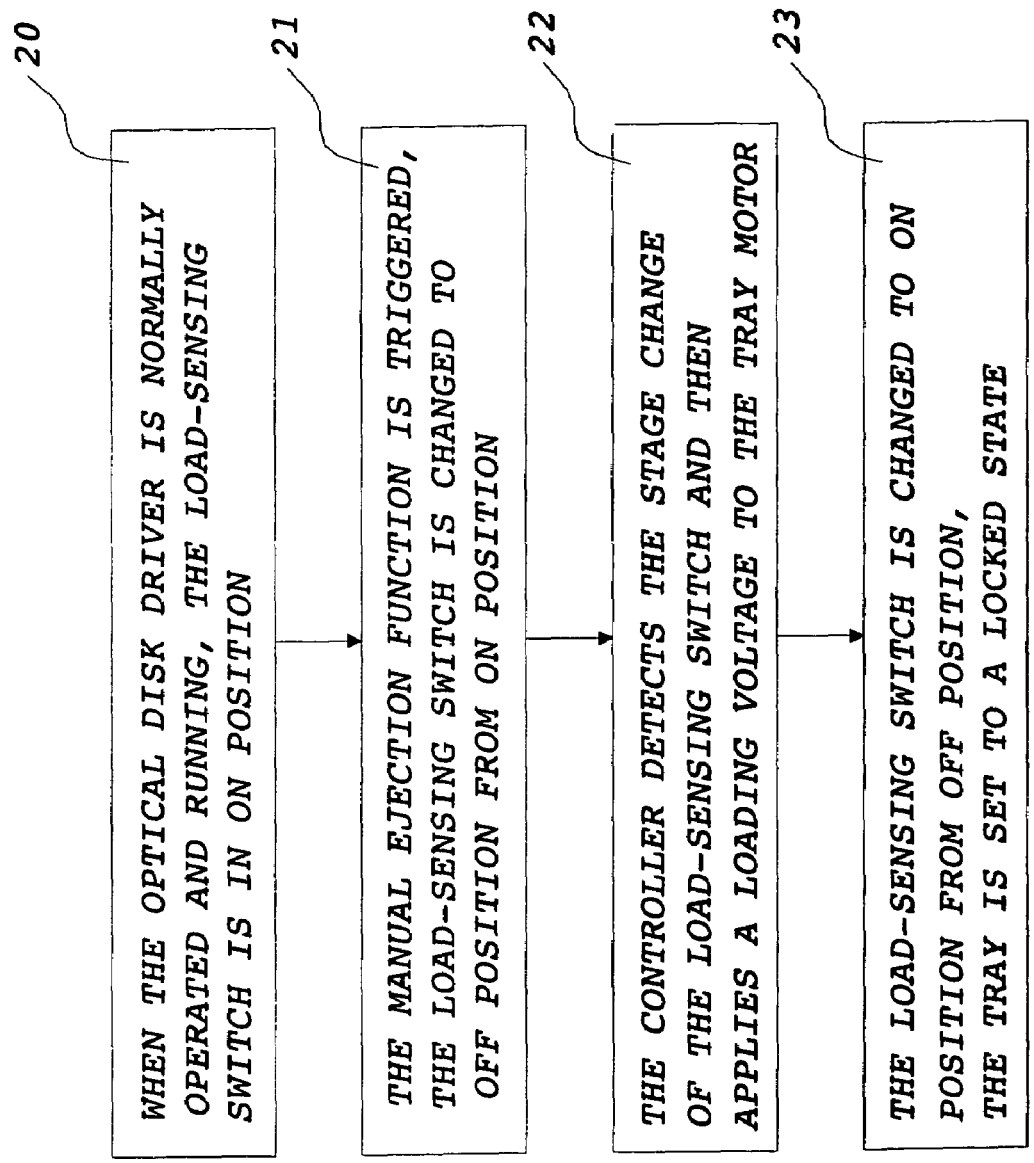
FIG. 3 shows the flowchart of the protection method for the manual ejection operation of optical disk drive.

As shown in FIG. 3, when the optical disk driver is normally operated and running, the load-sensing switch is in on position in step 20. At this time, the optical disk drive is in a locked state In the present invention, the load-sensing switch is used as judgment reference for the controller. If the optical disk drive is normally operated and running, and the manual ejection function is triggered, the load-sensing switch is changed to off position from on position in step 21.

When the manual ejection operation is triggered, the controller detects the stage change of the load-sensing switch and then applies a loading voltage to the tray motor in step 22, i.e., a forced ejection of the tray is resisted when the manual ejection operation is activated.

At this time, the load-sensing switch is changed to on position from off position, the tray is set to a locked state in step 23. The position of the load-sensing switch is returned to the previous position, i.e., the on position and the locked state is maintained.

Therefore, the present invention utilizes a loading voltage applied to the tray motor to avoid a forced ejection of a tray from the optical disk drive and then the locked state is maintained. The loading voltage is a voltage of a predetermined level that is larger enough to resist the ejection of the tray when the manual ejection operation is activated. Thus, the manual ejection function is failed in a locked state.

By the present invention, the optical disk itself would not be destroyed for its exhausted rotating outside the optical disk drive and the user information could be read out successfully. Also, the user information that attempts to be recorded/reproducing in the optical disk could be recorded/reproducing successfully.

As a result, the present invention can prevent the damage of optical disk drive and optical disk due to carelessly activating the manual ejection operation when the optical disk is in the rotating state, especially with high rotation speed.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claim.

What is claimed is:

1. A protection method for a manual ejection operation of an optical disk drive, comprising the steps of:
   setting a locked state when the optical disk drive is in a normal rotation;
   activating the manual ejection operation; and
   maintaining the locked state by applying a loading voltage to a tray motor to resist a forced ejection of a tray.

2. The protection method for the manual ejection operation of the optical disk drive as claimed in claim 1, wherein the manual ejection operation is performed by inserting a slim bar into a round opening on a panel of the optical disk drive.

3. A protection method for a manual ejection operation of an optical disk drive, comprising the steps of:
   activating the manual ejection operation;
   sensing a stage change from a first stage to a second stage of a load-sensing switch in a locked state;
   applying a loading voltage to a tray motor to resist a forced ejection of a tray; and
   returning to the first stage of the load-sensing switch.

4. The protection method for the manual ejection operation of the optical disk drive as claimed in claim 3, wherein the locked state is set when the optical disk drive is in normal rotation.

5. The protection method for the manual ejection operation of the optical disk drive as claimed in claim 3, wherein the manual ejection operation is performed by inserting a slim bar into a round opening on a panel of the optical disk drive.

6. The protection method for the manual ejection operation of the optical disk drive as claimed in claim 3, wherein the first stage is an on stage or an off stage.

7. The protection method for the manual ejection operation of the optical disk drive as claimed in claim 3, wherein the second stage is an on stage or an offstage.

8. A protection method for a manual ejection operation of an optical disk drive, comprising the steps of:
   activating the manual ejection operation; and
   applying a loading voltage to a tray motor to resist a forced ejection of a tray if the optical disk is in a normal rotation.

* * * * *